United States Patent
Kawamura

(10) Patent No.: US 7,639,304 B2
(45) Date of Patent: Dec. 29, 2009

(54) IMAGE PICKUP DEVICE AND METHOD FOR AUTOMATIC EXPOSURE CONTROL AND EXPOSURE CONTROL BASED ON A USER-SET VALUE AND COMPUTER-READABLE STORAGE MEDIUM HAVING A PROGRAM FOR CONTROLLING SUCH A DEVICE

(75) Inventor: Masaru Kawamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 11/567,399

(22) Filed: Dec. 6, 2006

(65) Prior Publication Data
US 2007/0091202 A1  Apr. 26, 2007

Related U.S. Application Data

(62) Division of application No. 10/212,771, filed on Aug. 7, 2002, now Pat. No. 7,212,243.

(30) Foreign Application Priority Data
Aug. 16, 2001 (JP) .............................. 2001-247099

(51) Int. Cl.
H04N 5/235 (2006.01)
H04N 5/222 (2006.01)

(52) U.S. Cl. ...................... 348/362; 348/371
(58) Field of Classification Search ................. 348/362, 348/363, 364, 365, 366, 370, 371; 396/166, 396/167
See application file for complete search history.

(56) References Cited

U.S. PATENT DOCUMENTS

| 4,196,988 | A | | 4/1980 | Kawasaki | 396/161 |
|---|---|---|---|---|---|
| 4,805,010 | A | * | 2/1989 | Shroyer et al. | 348/224.1 |
| 4,812,870 | A | | 3/1989 | Kawamura | 354/412 |
| 4,833,536 | A | | 5/1989 | Okino et al. | 348/229.1 |
| 4,837,596 | A | | 6/1989 | Kawamura | 354/442 |
| 4,862,205 | A | | 8/1989 | Kawamura | 354/412 |
| 5,384,617 | A | * | 1/1995 | Kobayashi et al. | 396/165 |
| 5,600,389 | A | * | 2/1997 | Saegusa | 396/166 |
| 5,822,625 | A | | 10/1998 | Leidig et al. | 396/77 |
| 6,654,062 | B1 | * | 11/2003 | Numata et al. | 348/362 |
| 2001/0003466 | A1 | * | 6/2001 | Kubo | 348/366 |
| 2003/0098922 | A1 | * | 5/2003 | Barkan | 348/362 |

FOREIGN PATENT DOCUMENTS

JP  6-105221  4/1994

* cited by examiner

*Primary Examiner*—Jason Chan
*Assistant Examiner*—Nicholas G Giles
(74) *Attorney, Agent, or Firm*—Fitzpatrick, Cella, Harper & Scinto

(57) ABSTRACT

An image pickup device designed to always ensure improved facility with which an object is recognized even in a manual exposure control mode. The image pickup device includes an exposure control device capable of being selectively set in one of an automatic mode and a manual mode, and an operating member for starting processing and storage of an image signal. In this image pickup device, to achieve the above-mentioned effect, an image obtained in the automatic mode is displayed immediately before the operation of the operating member even in a case where photographing is performed in the manual mode.

13 Claims, 3 Drawing Sheets

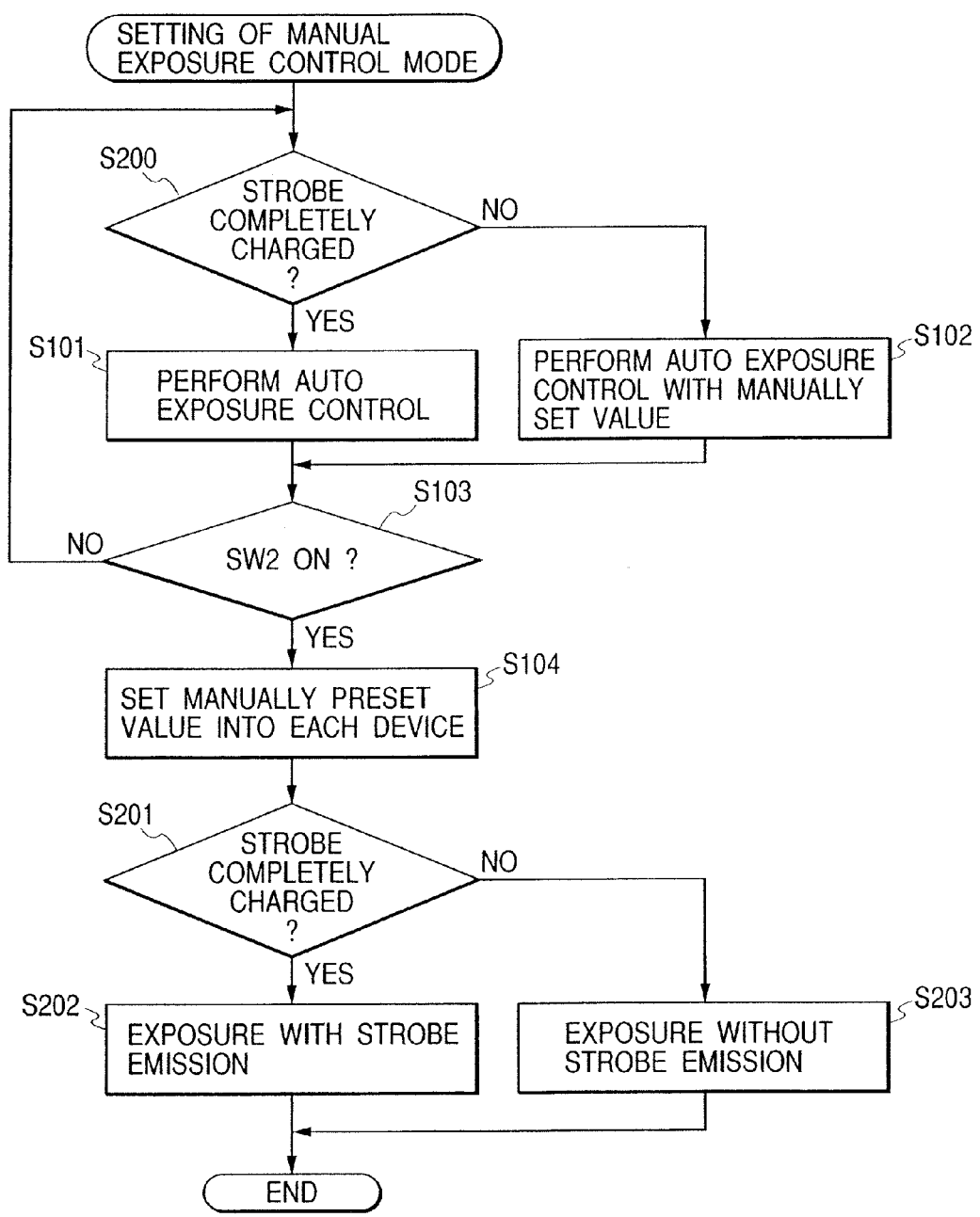

IMAGE PICKUP DEVICE AND METHOD FOR AUTOMATIC EXPOSURE CONTROL AND EXPOSURE CONTROL BASED ON A USER-SET VALUE AND COMPUTER-READABLE STORAGE MEDIUM HAVING A PROGRAM FOR CONTROLLING SUCH A DEVICE

CROSS-REFERENCE TO RELATED APPLICATION

The present application is a Divisional Application of U.S. application Ser. No. 10/212,771 filed Aug. 7, 2002, pending.

BACKGROUND OF THE INVENTION

1. Field of the Invention

The present invention relates to an image pickup device capable of operating in a mode selected from a plurality of exposure control modes including a manual exposure control mode, and to a computer-readable storage medium on which a program for controlling the image pickup device is stored.

2. Related Background Art

Recent automated cameras have a system for automatically determining the amount of exposure by using a central processing unit (CPU) incorporated in the camera. Such a system enables easier photographing in each of an aperture value priority mode, a shutter speed priority mode, a mode of photographing based on a predetermined program diagram (program), etc.

Some electronic cameras using an image pickup element such as a charge-coupled device (CCD) are designed so that the image pickup element is also used as a photometric sensor for the purpose of reducing the manufacturing cost. In such cameras, since the image pickup element is used as a photometric sensor, signals representing data, for example, on image brightness, colors, and sharpness are extracted from an image imaged on the image pickup element, and control operations, such as automatic exposure, white balancing, automatic focusing and strobe light control are performed on the basis of the signals.

An image imaged on the image pickup element is output through an image output device, such as an electronic view finder using a liquid crystal display (LCD) or the like, or a video output device. When an operator checks the image imaged on the image pickup element, for example, by outputting the image through the image output device, exposure control for maintaining the main object at a certain brightness level is required.

On the other hand, the operator can make the camera perform automatic exposure control after selecting at least one of desirable exposure control values: an aperture value AV, a shutter speed TV, and a sensitivity SV and selecting one of exposure control modes, such as an aperture value priority mode and a shutter speed priority mode. The operator can also make the camera perform exposure control with values all set by the user in a manual mode or the like.

The operator can also make the camera perform automatic exposure control in a photographing mode in which a shutter speed or an aperture selection effect can be obtained while no exposure control value is designated, e.g., a high-speed shutter mode using a program diagram such that a higher shutter speed is set, or a landscape mode using a program diagram such that a smaller aperture value is set.

The operator can also make the camera perform light control during photographing using a strobe in such a manner that photometry is performed when a strobe does not emit light to an object and when the strobe emits light as a pre-emission to the object, and the reflectivity of the object is computed from the difference between the two photometry results to determine the quantity of light to be emitted at the time of actual photographing. It is, of course, possible for the operator to perform a manual control operation for determining the quantity of light to be emitted by the strobe.

However, in taking a picture of an object under some conditions, including a selected exposure control value, there is a possibility of failure to display an image on an image output device suitably enough to ensure sufficient facility with which the image is framed.

In particular, a photographing operation that presupposes the use of strobe light may require an underexposure setting, depending on the quantity of strobe light. In such a case, if exposure control is performed without regard to the underexposure condition, the image is displayed in a dimmed condition on the image output device and cannot be easily framed.

For example, in a case where there is a difference between the aperture value AV, the shutter speed TV and the sensitivity SV set with respect to an object in automatic-exposure photographing and the aperture value AV, the shutter speed TV and the sensitivity SV set with respect to the object in photographing with strobe light, a difference in brightness of the images output to image output device may occur between these two photographing modes. In contrast to automatic exposure, a certain amount of underexposure is ordinarily set in photographing with strobe light by considering the superimposition of the quantity of strobe light on an object. Therefore, when the aperture value AV, the shutter speed TV, etc., are set with respect to an object in photographing with strobe light, the amount of underexposure may be considerably large, depending on conditions relating to the object.

SUMMARY OF THE INVENTION

In view of the above-described circumstances, an object of the present invention is to provide an image pickup device in which, even when a manual exposure mode is selected, automatic exposure control is performed by ignoring a set exposure control value to ensure improved facility with which an object is recognized as well as facility with which framing is performed.

According to the present invention, there is provided an image pickup device including: an image pickup element which receives light from an object to form an image signal; an exposure control device; a device capable of setting an automatic exposure control mode and a manual exposure control mode as a mode of operation of the exposure control device; and a photographing initiation operating member for initiating processing and storage of the image signal output from the image pickup element, in which even when the manual exposure mode is set, the image pickup element outputs the image signal in association with the exposure control device operating in the automatic exposure control mode before the photographing initiation operating member is operated.

According to another aspect of the present invention, there is provided an image pickup device including: an image pickup element which receives light from an object to form an image signal; an exposure control device; a device capable of setting an automatic exposure control mode and a manual exposure control mode as a mode of operation of the exposure control device; a photographing initiation operating member for initiating processing and storage of the image signal output from the image pickup element; and a selection device capable of selecting between outputting of the image signal from the image pickup element in association with the exposure control device operating in the automatic exposure control mode and outputting of the image signal from the image pickup element in association with the exposure control device operating in the manual exposure control mode before the photographing initiation operating member is operated, even if the manual exposure control mode is set.

Also, according to another aspect of the present invention, there is provided an image pickup device including: an image pickup element which receives light from an object to form an image signal; an exposure control device; a device capable of setting an automatic exposure control mode and a manual exposure control mode as a mode of operation of the exposure control device; a photographing initiation operating member for initiating processing and storage of the image signal output from the image pickup element; and a selection device capable of selecting, according to whether photographing with strobe light can be performed, between outputting of the image signal from the image pickup element in association with the exposure control device operating in the automatic exposure control mode and outputting of the image signal from the image pickup element in association with the exposure control device operating in the manual exposure control mode before the photographing initiation operating member is operated.

Also, according to another aspect of the present invention, there is provided a computer-readable storage medium having a program for controlling an image pickup device having an image pickup element which receives light from an object to form an image signal, an exposure control device, a device capable of setting an automatic exposure control mode and a manual exposure control mode as a mode of operation of the exposure control device, and a photographing initiation operating member for initiating processing and storage of the image signal output from the image pickup element, the program including the step of: executing, when the manual exposure control mode is set, selection processing enabling selection between outputting of the image signal from the image pickup element in association with the exposure control device operating in the automatic exposure control mode and outputting of the image signal from the image pickup element in association with the exposure control device operating in the manual exposure control mode before the photographing initiation operating member is operated.

BRIEF DESCRIPTION OF THE DRAWINGS

FIG. 3 is a flowchart for explaining processing in a manual exposure control mode in another embodiment of the present invention.

DESCRIPTION OF THE PREFERRED EMBODIMENTS

An image pickup device, a method of controlling the image pickup device, a program, and a computer-readable storage medium in accordance with the present invention will be described with reference to the accompanying drawings.

Figure 1:
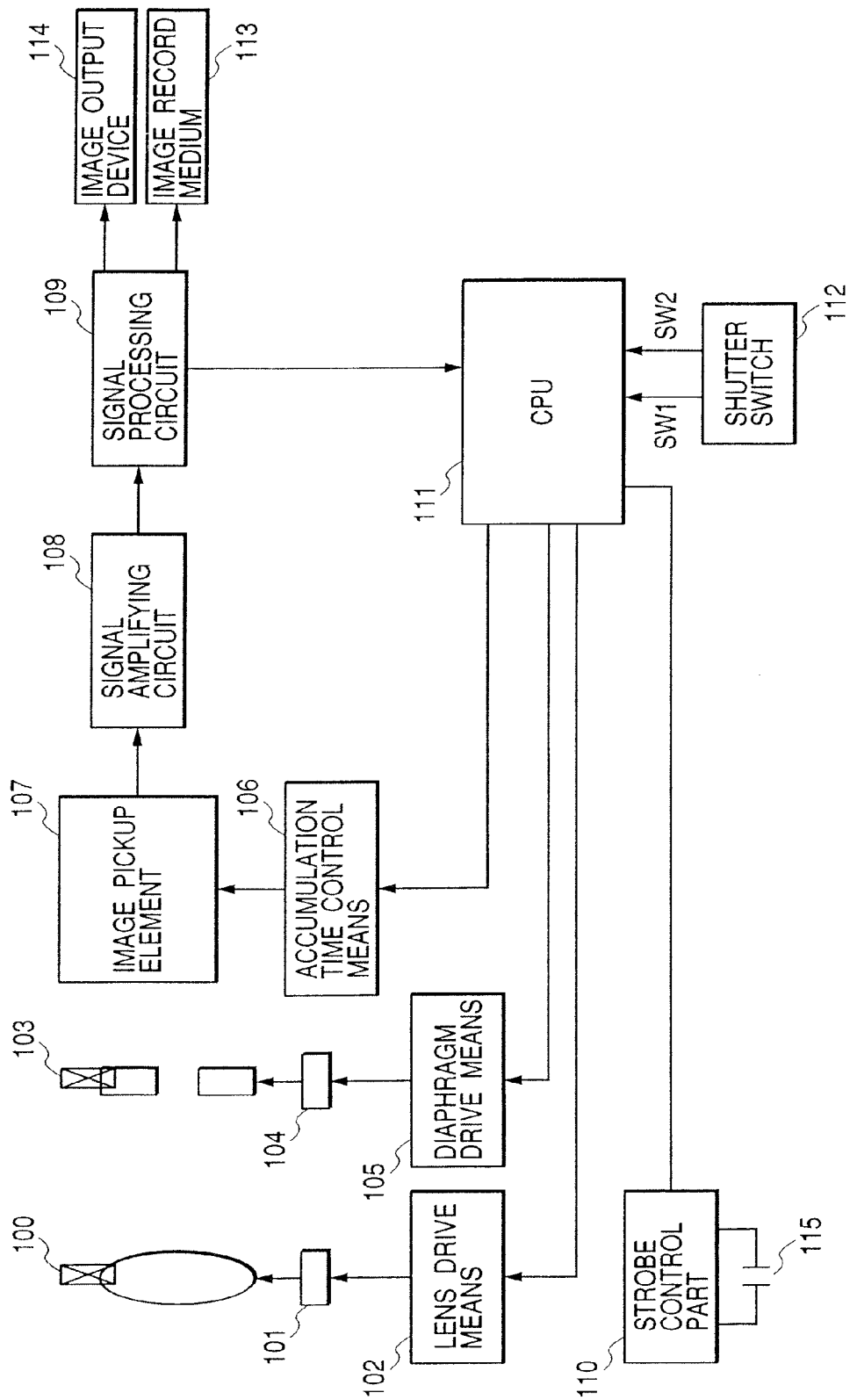
FIG. 1 is a block diagram showing a construction of an image pickup device.

FIG. 1 is a block diagram showing a construction of the image pickup device. This image pickup device is capable of moving image photographing as well as still image photographing and is also capable of selecting a manual exposure control mode in which manual exposure control can be performed. Referring to FIG. 1, the image pickup device has a lens 100 constituting a photographing optical system, a control motor 101 for driving the lens 100, and a motor driver 102 which functions as a lens drive means for driving the control motor 101.

The image pickup device also has a diaphragm 103, a control motor 104 for driving the diaphragm 103, and a motor driver 105 which functions as a diaphragm drive means to drive the control motor 104.

The image pickup device also has an image pickup element 107 which is provided as an image pickup device, and which is constituted by a CCD or the like capable of photoelectric conversion of light incident thereon, and a shutter drive circuit 106 which functions as an accumulation time control means for controlling the accumulation time of charge to be converted by photoelectric conversion in the image pickup element 107.

The image pickup device further has a signal amplifying circuit 108 such as an automatic gain control (AGC) which changes the gain of a signal output from the image pickup element 107, a signal processing circuit 109, and a strobe control part 110 for controlling a strobe (not shown).

The image pickup device further has a CPU 111 which performs overall control of the image pickup device by performing computational processing, and a shutter switch 112 for inputting an instruction to start photographing. When the shutter switch 112 is moved to an intermediate operating position (half-pressed), a shutter switch SW1 is turned on to initiate an operation such as automatic exposure processing. When the operation of the shutter switch 112 is completed (fully depressed), a shutter switch SW2 is turned on to initiate a sequence of operations including a normal exposure operation, an image processing operation in the signal processing circuit 109, and storage in an image record medium 113 of a signal obtained as a result of image processing.

In the thus-arranged image pickup device, an optical signal which has passed through the lens 100 is converted into an electrical signal in the image pickup element 107, and this signal is input to the signal processing circuit 109 via the signal amplifying circuit 108.

The CPU 111 performs exposure control. To perform aperture control, the CPU 111 controls opening/closing of the diaphragm 103 making the motor driver 105 drive the control motor 104 on the basis of an aperture value AV.

To perform shutter speed control, the CPU 111 controls the time for accumulation of charge in the image pickup element 107 (i.e., the amount of accumulated charge) by controlling the shutter drive circuit 106 on the basis of a shutter speed TV. Thus, the circuit 106 functions as an accumulation time control means.

To control the signal amplifying gain, the CPU 111 controls the signal amplifying circuit 108 on the basis of a gain value. The signal input from the image pickup element 107 is amplified by the signal amplifying circuit 108 on the basis of the gain set by the gain control.

To perform automatic exposure control in an automatic exposure control mode, a brightness level signal indicating the current brightness signal level is extracted from the signal input to the signal processing circuit 109 and is input to the CPU 111. The CPU 111 performs a photometry operation on the basis of this brightness level signal to obtain an object brightness BV. While use of the image pickup element 107 as a photometry means has been described, a sensor or the like for photometry only may alternatively be used to enable the object sensitivity BV to be obtained. Also, when the photometry operation is performed, weighting of a measured light distribution may be changed by being linked to the automatic focusing frame (AF).

On the basis of the object brightness BV obtained as described above, the aperture value AV, the shutter speed TV and the gain value are determined from a program diagram in which the relationships between the sensitivity SV, the aperture value AV, the shutter speed TV, and the gain value are prescribed. The diaphragm, the aperture value, the shutter speed, and the gain are controlled on the basis of the control values, thus performing exposure control.

The signal from the image pickup element 107 on which exposure control has been performed as described above is processed in the signal processing circuit 109 to form an image signal to be output to an image output device 114 which is an electronic view finder, a video output device, or the like.

The CPU 111 can also control charging on a main capacitor 115 of the strobe control part 110, which accumulates charging voltage for strobe emission. The CPU 111 performs this control by supplying the strobe control part 110 with a pulse signal for charging or a reference voltage for charging. The selection of the method of this charging depends on the construction of the strobe control part 110. When the main capacitor 115 has a sufficient amount of charge, the CPU 111 can perform emission control by supplying a trigger signal to the strobe control part 110.

Figure 2:
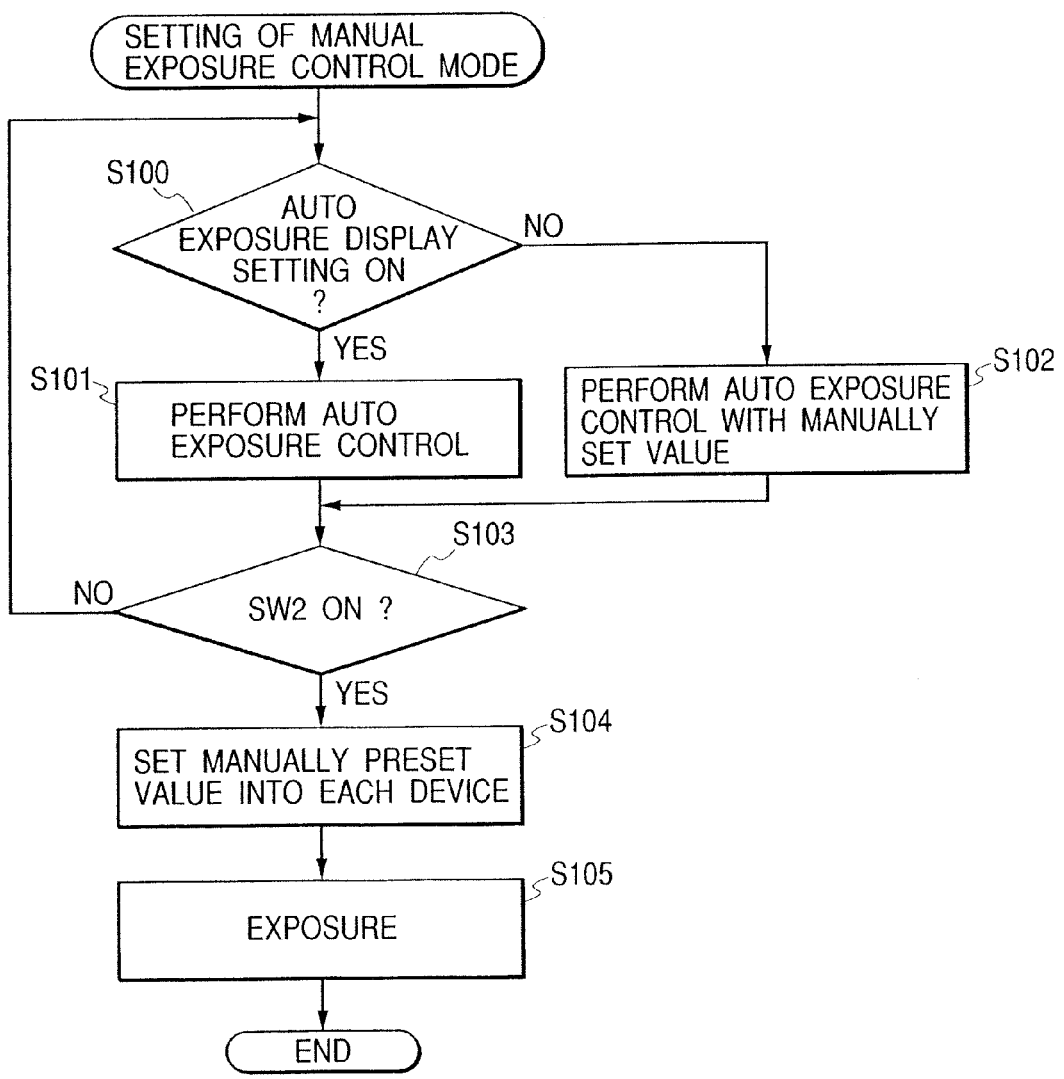
FIG. 2 is a flowchart for explaining processing in a manual exposure control mode in an embodiment of the present invention.

Processing in the manual exposure control mode in an embodiment of the present invention will be described with reference to the flowchart of FIG. 2. When an operator changes the exposure control mode to enable manual exposure (setting of the manual exposure control mode) and selects and sets an aperture value AV and a shutter speed TV, a check is made to determine whether automatic exposure display setting has been selected (step S100). Automatic exposure display setting may be selected by the operator using an operating member (not shown) for this setting or may be automatically set when photographing with strobe light is selected.

A detachably mountable external strobe whose charging state can be detected, for example, by communication or by checking a voltage condition at a terminal other than the X-contact of the accessory shoe can be operated in the same manner as the strobe incorporated in the camera. Even in a case where the state of charge in a strobe cannot be detected from the camera side, as in a detachably mountable external strobe having no control means other than the X-contact, a determination can be made as to whether strobe emission control can be performed, if a detection device, such as a switch, detects a state where an external strobe is attached to the accessory shoe. Even in such a case, therefore, the strobe can be operated in the same manner.

If an automatic exposure display setting has been selected, automatic exposure is performed (step S101) to output a suitable moving image through the image output device 114. If an operation accompanied by exposure correction is performed, a correction device may be provided to perform exposure correction, for example, according to the subject distance. In such a case, if the subject distance cannot be determined, exposure correction is not performed. Alternatively, exposure correction may be performed according to the position of the zoom lens and the position of the focusing lens of the lens 100. Alternatively, exposure correction may be performed according to the sensitivity. Alternatively, exposure correction may be performed in a case where lighting correction is made. Alternatively, exposure correction may be performed according to the quantity of light emitted at the time of photographing.

If automatic exposure display setting has not been selected, exposure control is performed with manually set exposure value EV (step S102). In this case, if the operator can set the sensitivity SV for actual photographing, the exposure value EV may be computed by considering the sensitivity in the current operation mode to enable exposure control.

The state of the shutter switch SW2 is then checked as to whether the shutter switch SW2 has been turned on (step S103). If the shutter switch SW2 is not turned on, the process returns to step S100 and the steps described above are repeated. If the shutter switch SW2 is turned on, the aperture value AV and the shutter speed TV manually preset are set into each device (step S104). The exposure operation for actual photographing is then started (step S105), followed by photographing with strobe emission.

The above-described processing ensures that even when the manual exposure control mode is set, either of automatic exposure control and manual exposure control can be selected before the operation of the shutter switch SW2, and that, if automatic exposure control is performed before the shutter switch SW2 is turned on, an image is displayed on the image output device 114 with such a brightness that the main object can be recognized immediately before the photographing operation is started, thus improving the operability with respect to framing.

Photographing with strobe emission in the manual exposure control is performed as described above. However, it is also possible to improve the operability with respect to framing in the case of photographing without strobe emission by using a similar procedure. The exposure control at that time can be performed by a manual or automatic operation.

In a case where an aperture shutter capable of a fully closing operation is used, because the maximum speed of the shutter speed becomes faster as the aperture diameter becomes smaller, if the shutter speed TV is set to $\frac{1}{1000}$ when the aperture value AV is smaller than F8, the aperture value AV is limited to F8 if $\frac{1}{1000}$ is designated in the shutter speed priority mode, even in a situation where maximum-aperture setting should be made. If exposure control is performed under such a condition, there is a possibility of difficulty in performing framing as in the case of photographing with strobe emission, depending upon the condition of the object. In such a situation, the image pickup device may be operated in the same manner to achieve the same effect.

In such a case, however, if exposure control is performed without consideration of the exposure value EV at the time of photographing when the shutter switch SW1 is depressed, it is possible that the brightness at the time of actual photographing will differ greatly from the desired value so as to cause distortion in the operator's recognition of the displayed image. Therefore it is effective to use an arrangement in which an operating member (not shown) such as a switch is separately prepared and functions are changed by an input from the operating member, or to use a method of displaying information about the difference of the recognized brightness from that at the time of actual photographing to warn the operator of the undesirable condition.

Processing in the manual exposure control mode in another embodiment of the present invention will be described.

When forced strobe emission or automatic strobe emission is selected and when the brightness is low, photographing using the strobe is performed, provided that the main capacitor 115 of the strobe control part 110 is sufficiently charged to cause the strobe to emit light. Under this condition, automatic exposure is performed to output a suitable moving image through the image output device 114, as described above in the description of the first embodiment.

However, when the amount of charge on the main capacitor 115 is insufficient, photographing with strobe light cannot be performed. If, in such a situation, a moving image is displayed on the image output device 114 by performing automatic exposure control, there is a risk of allowing the operator to erroneously recognize that photographing with strobe emission will be performed.

When the shutter switch SW2 is turned on in such a situation, the process described above in the description of the first embodiment may be performed if photographing is performed after waiting for the completion of sufficient charging on the main capacitor 115. However, if the time before the completion of charging is long, the shutter chance is missed. In some cases, by considering this problem, photographing based on automatic exposure is performed without causing the strobe to emit light.

In the case of a strobe incorporated in the camera that uses power supplied from an internal power supply of the camera, the time before the completion of charging can be predicted by the CPU 111. In contrast, an external strobe, for example, ordinarily uses an external power source different from that in the camera. The CPU 111 cannot predict the time before the completion of charging in such an external strobe. In such a case, it is impractical to wait for the completion of charging, and photographing based on automatic exposure control is therefore performed.

Processing in the manual exposure control mode performed by considering the above-mentioned points will be described with reference to the flowchart of FIG. 3. In FIG. 3, steps corresponding to those shown in the flowchart of FIG. 2 are indicated by the same reference characters.

When an operator changes the exposure control mode to enable manual exposure (setting of the manual exposure control mode) and selects and sets an aperture value AV and a shutter speed TV, a check is made to determine whether charging on the main capacitor 115 of the strobe has been completed (step S200). If charging on the main capacitor 115 has been completed, photographing with strobe light can be performed and automatic exposure control is therefore performed (step S101). If charging on the main capacitor 115 has not been completed, exposure control is performed by using the set exposure value EV (step S102).

The state of the shutter switch SW2 is then checked as to whether the shutter switch SW2 has been turned on (step S103). If the shutter switch SW2 is not turned on, the process returns to step S200 and the steps described above are repeated. When charging on the main capacitor 115 is completed while these steps are being repeated, automatic exposure control is performed and a bright image is output through the image output device 114, thereby enabling the operator to know the completion of charging on the main capacitor 115. Thus, the operator can determine from the state of the output image whether photographing with strobe light will be performed.

When the shutter switch SW2 is turned on, the aperture value AV and the shutter speed TV manually preset are set into each device (step S104). A check is then made to determine whether charging on the main capacitor 115 has been completed (step S201). If charging on the main capacitor 115 has been completed, photographing with strobe light can be performed and photographing with strobe emission is therefore performed (step S202). If charging on the main capacitor 115 has not been completed, photographing without strobe emission is performed (step S203).

The present invention includes, within its scope, an implementation of a method in which program codes of software for realizing the functions of each of the above-described embodiments of the present invention are supplied to a computer in an apparatus or a system connected to various devices and capable of operating the devices so as to realize the functions of the embodiment, and in which the various devices are operated on the basis of a program stored in the computer (CPU or MPU) of the system or apparatus.

In such a case, the program codes themselves of the above-mentioned software realize the functions of each of the above-described embodiments, and the program codes themselves constitute the present invention. As a medium for transmission of the program codes, a communication medium (a cable such as an optical fiber cable, a wireless channel, or the like) in a computer network (a LAN, a WAN such as the Internet, a wireless communication network, or the like) system for supplying program information by transmitting the same on a carrier wave may be used.

Further, means for supplying the program codes to the computer, e.g., a storage medium on which the program codes are stored constitutes the present invention. As the storage medium for storing the program codes, a flexible disk, a hard disk, an optical disc, a magneto-optical disc, a compact disc-read only memory (CD-ROM), a magnetic tape, a nonvolatile memory card, a ROM, etc., may be used.

Needless to say, the present invention includes, in its embodiments, program codes not only in a case where the program codes supplied to a computer are executed by the computer to realize the functions of each of the above-described embodiments, but also in a case where the program codes are used in association with an operating system (OS) or a piece of application software running on a computer.

Further, needless to say, the present invention comprises realization of the functions of each of the above-described embodiments achieved by performing processing in such a manner that supplied program codes are stored in a memory provided in a function expansion board of a computer or a function expansion unit connected to the computer, and a CPU or the like provided in the function expansion board or the function expansion unit performs part or the whole of actual processing on the basis of instructions according to the program codes.

The configuration and structure of the components of the embodiments described above have been shown only as an example in implementation of the present invention, and are not to be construed as limiting the technical scope of the present invention. That is, the present invention can be implemented in various forms without departing from essential features thereof.

According to the above-described embodiments, even in a situation where an image is not correctly displayed on an image output device under certain conditions including a manually set exposure control value, automatic exposure control is performed to display the image with such a brightness that the main object can be recognized immediately before the photographing operation is started, thus improving the object recognition and improving the operability with respect to framing.

What is claimed is:

1. An image pickup device comprising:
   an image pickup element which receives light from an object and outputs an image signal;
   an image display unit which performs display of an image representing the image signal output from the image pickup element;

an exposure control; unit which performs exposure control in each of a first exposure control mode for performing an automatic exposure control for obtaining a proper exposure state and a second exposure control mode for performing the exposure control on the basis of an exposure control value set by a user;

an operation unit which is used for transmitting an image pickup instruction for starting storage of image data on the basis of the output of the image pickup element;

an instruction unit which instructs the exposure control unit to perform the exposure control in the first exposure control mode before and until the image pickup instruction is transmitted; and a selection unit that selects one of the first and second exposure control modes, wherein the selection unit selects the exposure control mode in which the exposure control unit performs exposure control after the operation unit transmits the image pickup instruction, so that exposure control after the transmission of the image pickup instruction occurs in either the first exposure control mode or the second exposure control mode, depending on the exposure control mode selected by the selection unit, wherein when the selection unit selects the second exposure control mode as the exposure control mode in which exposure control is performed by the exposure control unit after the operation unit transmits the image pickup instruction:

the exposure control unit performs the exposure control in the first exposure control mode before and until the image pickup instruction is transmitted when the instruction unit instructs the exposure control unit to perform the exposure control in the first exposure control mode before and until the image pickup instruction is transmitted; and the exposure control unit performs the exposure control in the second control mode before and until the image pickup instruction is transmitted when the instruction unit does not instruct the exposure control unit to perform the exposure control in the first exposure control mode before and until the image pickup instruction is transmitted, and wherein the image display unit displays the image on the basis of the output of the image pickup element until the image pickup instruction is transmitted.

2. An image pickup device according to claim 1, wherein said exposure control unit controls at least one of an aperture value, the accumulation time of said image pickup element, and an amplification gain of the image signal output from said image pickup element.

3. An image pickup device according to claim 1, further comprising a correction device which performs exposure correction in the first exposure control mode.

4. An image pickup device according to claim 3, wherein said correction device performs the exposure correction according to the object distance.

5. An image pickup device according to claim 4, wherein said correction device does not perform the exposure correction if the object distance cannot be determined.

6. An image pickup device according to claim 3, wherein said correction device performs the exposure correction according to the position of a lens included in a photographing optical system.

7. An image pickup device according to claim 3, wherein said correction device performs the exposure correction according to the sensitivity of said image pickup device.

8. An image pickup device according to claim 3, wherein said correction device performs the exposure correction in a case where a lighting correction is made.

9. An image pickup device according to claim 3, wherein said correction device performs the exposure correction according to the quantity of light emitted at the time of a photographing operation comprising processing and storage of the image signal output from said image pickup element.

10. An image pickup device according to claim 1, wherein the instruction unit instructs the exposure control unit to perform exposure control in the first exposure control mode in a state where an image pickup operation is performed with a strobe emission when the image pickup instruction is transmitted.

11. An image pickup device according to claim 1, further comprising a second operation unit which performs a setting operation that sets the performing of the image pickup operation with a strobe emission when the image pickup instruction is transmitted, wherein in a case that the second operation unit performs the setting operation that sets the performing of the image pickup operation with the strobe emission when the image pickup instruction is transmitted, the instruction unit instructs the exposure control unit to perform the exposure control in the first exposure control mode.

12. A computer-readable storage medium having a program for controlling an image pickup device having an image pickup element which receives light from an object and outputs an image signal, an exposure control unit which performs exposure control in each of a first exposure control mode for performing an automatic exposure control for obtaining a proper exposure state and a second exposure control mode for performing the exposure control on the basis of an exposure control value set by a user, an operation unit which is used for transmitting an image pickup instruction for starting storage of image data on the basis of the output of the image pickup element, an instruction unit which instructs the exposure control unit to perform the exposure control in the first exposure control mode before and until the image pickup instruction is transmitted, and a selection unit that selects one of the first and second exposure control modes, wherein the selection unit selects the exposure control mode in which the exposure control unit performs exposure control after the operation unit transmits the image pickup instruction, so that exposure control after the transmission of the image pickup instruction occurs in either the first exposure control mode or the second exposure control mode, depending on the exposure control mode selected by the selection unit, said program instructing a computer to perform a method comprising the steps of:

selecting with the selection unit the second exposure control mode as the exposure control mode in which exposure control is performed by the exposure control unit after the operation unit transmits the image pickup instruction;

performing with the exposure control unit exposure control in the first exposure control mode before and until the image pickup instruction is transmitted in the event the instruction unit instructs the exposure control unit to perform the exposure control in the first exposure control mode before and until the image pickup instruction is transmitted;

performing with the exposure control unit exposure control in the second control mode before and until the image pickup instruction is transmitted in the event the instruction unit does not instruct the exposure control unit to perform the exposure control in the first exposure control mode before and until the image pickup instruction is transmitted; and causing the display device to display the image on the basis of the output of the image pickup element until the image pickup instruction is transmitted.

13. A method for controlling an image pickup device having an image pickup element which receives light from an object and outputs an image signal, an exposure control unit which performs exposure control in each of a first exposure control mode for performing an automatic exposure control for obtaining a proper exposure state and a second exposure control mode for performing the exposure control on the basis of an exposure control value set by a user, an operation unit which is used for transmitting an image pickup instruction for starting storage of image data on the basis of the output of the image pickup element, an instruction unit which instructs the exposure control unit to perform the exposure control in the first exposure control mode before and until the image pickup instruction is transmitted, and a selection unit that selects one of the first and second exposure control modes, wherein the selection unit selects the exposure control mode in which the exposure control unit performs exposure control after the operation unit transmits the image pickup instruction, so that exposure control after the transmission of the image pickup instruction occurs in either the first exposure control mode or the second exposure control mode, depending on the exposure control mode selected by the selection unit, said method comprising the steps of:

selecting with the selection unit the second exposure control mode as the exposure control mode in which exposure control is performed by the exposure control unit after the operation unit transmits the image pickup instruction;

performing with the exposure control unit exposure control in the first exposure control mode before and until the image pickup instruction is transmitted in the event the instruction unit instructs the exposure control unit to perform the exposure control in the first exposure control mode before and until the image pickup instruction is transmitted;

performing with the exposure control unit exposure control in the second control mode before and until the image pickup instruction is transmitted in the event the instruction unit does not instruct the exposure control unit to perform the exposure control in the first exposure control mode before and until the image pickup instruction is transmitted; and causing the display device to display the image on the basis of the output of the image pickup element until the image pickup instruction is transmitted.

\* \* \* \* \*